April 15, 1941. W. T. PARKIN 2,238,368
LIPSTICK HOLDER OF THE PROPEL-REPEL TYPE
Filed Dec. 28, 1937 2 Sheets-Sheet 1
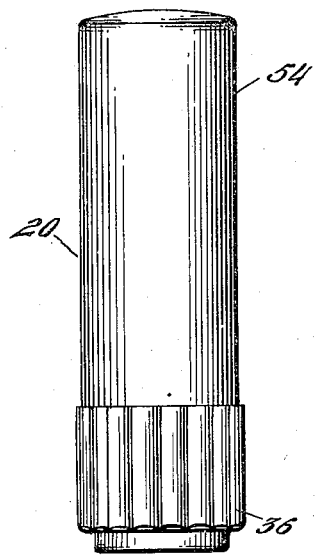
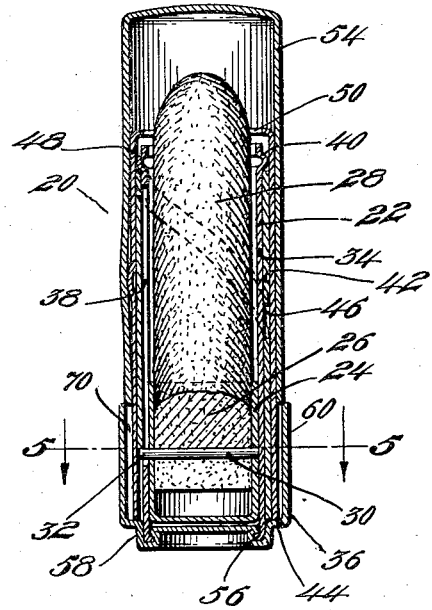
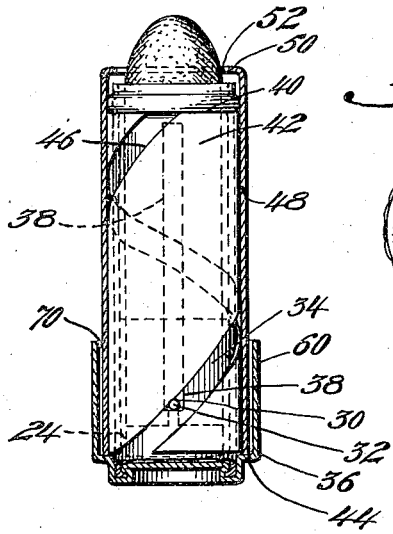
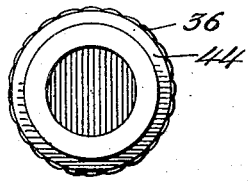
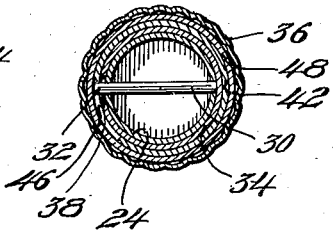
Inventor
Winfred T. Parkin
By Thomas A. Jenckes
Attorney

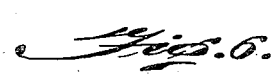 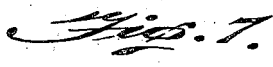 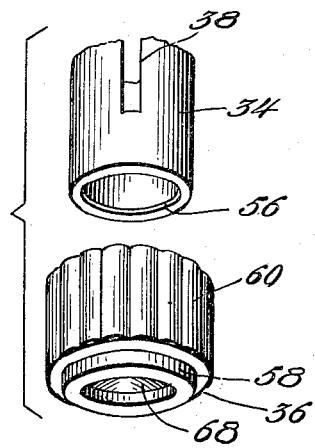 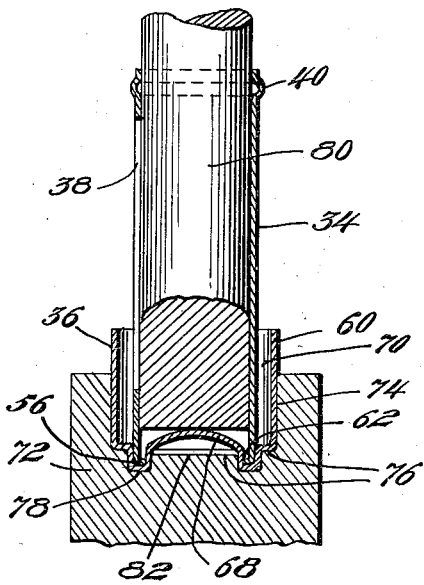  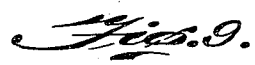 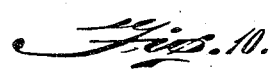 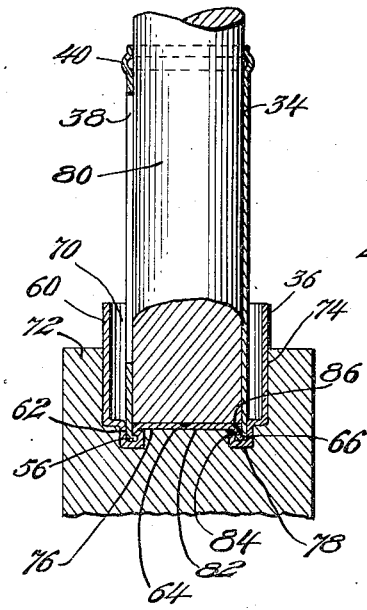 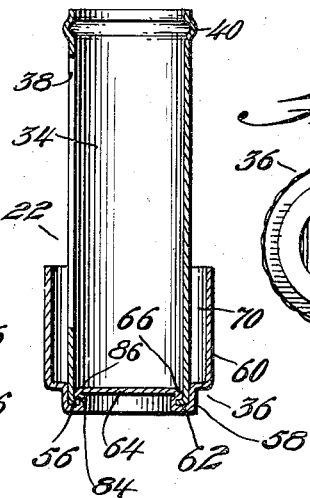 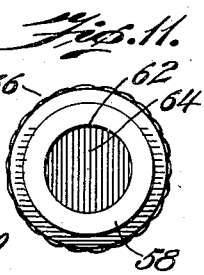 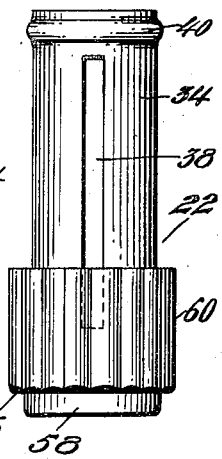

Patented Apr. 15, 1941

2,238,368

UNITED STATES PATENT OFFICE 2,238,368

LIPSTICK HOLDER OF THE PROPEL-REPEL TYPE

Winfred T. Parkin, Cranston, R. I., assignor to Theodore W. Foster & Bro. Company, Providence, R. I., a corporation of Maine Application December 28, 1937, Serial No. 182,146

2 Claims. (Cl. 206—56)

My invention relates to improvements in lipstick holders of the propel-repel type and, particularly, to the novel structure of inner shell and turning cap thereof which permits them to be swaged together in a novel manner.

In the prior art the lower end turning cap has usually been secured to the inner shell by means of pinning it to the base thereof or soldering it thereto. The end turning cap has often comprised a separate relatively heavy screw machine part, which then has had to be secured to the inner shell providing a fairly heavy structure.

An object of my invention is to provide a light inner shell which may be readily drawn and a light pressed turning cap swaged together to provide a strong construction comprising the inner shell and turning cap joined together of lighter weight and cheaper to manufacture than former types.

These and such other objects of my invention as may hereinafter appear will be best understood from a description of the accompanying drawings which illustrate an embodiment thereof and steps in its method of manufacture.

In the drawings, Fig. 1 is a side elevation of a lipstick holder of the propel-repel type employing an inner tube or shell and an end turning cap constructed and joined together in accordance with my invention.

Fig. 2 is a vertical sectional view of the parts shown in Fig. 1.

Fig. 3 is a vertical sectional view generally similar to Fig. 2 with the top cap of the lipstick holder removed and showing the spiral and inner shell in elevation.

Fig. 4 is a reverse plan view of said lipstick holder.

Fig. 5 is a cross sectional view taken along the line 5—5 of Fig. 2.

Figs. 6–8 diagrammatically illustrate steps in the method I preferably employ of swaging the inner shell to said turning cap.

Fig. 6 is a disassembled perspective view showing the lower end of the inner shell about to be inserted within the annular well provided therefor in the base of the turning cap.

Fig. 7 illustrates the turning cap inserted within a suitable die with the lower end of the inner shell inserted within said annular well and with a punch inserted within said inner shell about to flatten the central dome shaped portion of the base of said turning cap.

Fig. 8 illustrates the same parts shown in Fig. 7 after the press has completed its stroke flattening the upper surface of said dome shaped portion and forcing the excess metal provided by flattening said center portion from dome to flat shape circumferential outwardly and downwardly to provide an integral doubled over lip projecting outwardly from said center portion extending partially over said well and swaging said inner shell inturned circumferential lip within said well.

Fig. 9 is a vertical sectional view showing the composite turning member formed by the holder inner tube member swaged to said cup member in the manner illustrated in Figs. 6–8.

Fig. 10 is a side elevational view of said composite turning member.

Fig. 11 is a reverse plan view of said composite turning member.

In the drawings, wherein like characters of reference generally indicate like parts throughout, 20 generally indicates a lipstick holder of the propel-repel type in which my improved composite inner shell and turning member 22 is adapted to be used as a component part thereof, although said composite tube and cap may, if desired, be employed for any other desired use.

The standard type of lipstick holder of the propel-repel type as shown in Figs. 1–5, includes a lipstick cup 24 for holding the lower end 26 of the lipstick 28. Said lipstick cup 24 is provided with a removable pin 30 mounted in suitable bearings or holes diametrically of the wall of said cup 24 and which may be detachable to extend through the lower end of the lipstick to retain the lipstick within the cup in the manner shown. Said pin 30 has an end 32 projecting radially outwardly from one wall of said cup. An inner shell or feed tube 34 is also provided which is also provided with an integral or attached, usually knurled, turning end cap 36. It is to the improved structure of the inner feed tube and turning end cap and the means I employ for securing them together, that my invention particularly relates in the manner to be hereinafter described.

This inner shell or feed tube is also provided with an axial slot 38 and may also be provided with the circumferential stop shoulder or bead 40 projecting outwardly therefrom near the upper end thereof. A tubular spring member 42 usually surrounds the center tubular portion of the inner feed tube or shell 34 with its upper end normally abutting the shoulder 40 to cause the lower end thereof to abut the base 44 of said turning cap 36. Said spring member 42 is provided with a spiral or helical groove 46 therein and in practice the tip 32 of the pin 30 projects through the axial slot 38 in the inner tube and within the spiral groove 46 in said spring member or spiral 42. Another tubular member 48 provided with an inturned annular lip at the upper end thereof forming a passageway 52 at said upper end interior of said lip 50 for the end of the lipstick is provided. This is adapted to be forced downwardly over said spiral or spring member 42 to hold all the parts hitherto described together. It is obvious that as said body shell 48 compresses the spring member or spiral 42 within that it will hold it rigid so that on relative rotation of said turning cap 36 and attached inner shell 34 the tip 32 of the lipstick cup pin 30 will be forced axially upwards of said slot 38 by contacting the edge of the helical or spiral groove or guide way 46 in said spiral member 42, held stationary by said outer body shell 48 to advance or propel the lipstick within the holder. It is apparent, that the lipstick may be withdrawn or repelled within the holder by relative opposite rotation of said end cap 36 and body shell 48.

There is also usually provided in lipstick holders of this type a tubular outer top cap 54 adapted to be inserted over the parts hitherto described when the lipstick 28 is withdrawn within the holder to completely cover up the lipstick when its use is not desired for shipping or other purposes.

As stated hitherto, my invention particularly relates to the structure of the inner feed tube or shell 34 and its attached turning cap 36. As stated previously in the prior art, the end turning cap 36 has been attached to the inner tube or shell by means of pins extending through the solid base of the inner shell, by soldering or otherwise and the turning cap has often comprised a heavy part of a type capable of being manufactured on a screw machine which has tended to add undesirable weight to the entire lipstick. The hollow inner feed tube 34 may, if desired, be provided with the axial slot 38, and, when constructed in accordance with my invention, is provided with an inturned circumferential lip 56 at the lower end thereof. Said tube and lip may be suitably drawn or otherwise fabricated by pressure shaping, stamping, or otherwise from any suitable type of flat or round stock. The cylindrical turning cap 36 is provided with the usual base 58 and upstanding side wall 60. In accordance with my invention said base 58 is provided with the annular well 62 therein, preferably at a spaced distance from said side wall 60, and an integral flat center portion 64 having an integral doubled over lip 66 projecting circumferentially outwardly therefrom, formed from a flattened central dome shaped portion 68 of said base 58 interior of said well 62, extending partially over said well, and, abutting the wall of the tube 34 to compactly overlie the inturned circumferential lip 56 of said inner feed tube or shell 34, thus, swaging said tube lip 56 within said base well 62, as shown more particularly in Fig. 9.

The well 62 is preferably spaced from the wall 60 of said tube so that the lower end of the spiral 42 and body shell 48 may be contained in the annular space 70 between the wall 60 of said end cap 36 and the wall of said inner tube 34 as shown in Figs. 2 and 3.

As also stated my invention relates to improvements in the particular method of manufacturing such a device. As stated hitherto, the inner shell 34 with its attached inturned circumferential lip 56 at the open lower end thereof is suitably drawn in any desired fashion or otherwise pressure shaped, stamped or formed from flat or other stock. The hollow cylindrical turning cap 36 is also pressed, stamped or otherwise drawn, pressure shaped or fabricated from a suitable blank of flat or other stock, the annular well 62, said wall 60 and central dome shaped base portion 68 being preferably pressed or otherwise formed simultaneously. The lower end of the inner tube 34 is then inserted within said cup 36 so that the inturned circumferential lip 56 thereof may rest within said well 62.

In my preferred method of swaging said inturned lip 56 within the well 58 the cap 36 is placed in a suitably shaped die 72 having the socket 74 for containing the outer cup wall 60 and the flat base 76 provided with the annular socket 78 for receiving said well 62. The lower end of said feed tube 34 and integral circumferential lip 56 is then inserted within said well 62 contained as aforesaid in socket 78. The cylindrical punch member 80 of substantially the internal diameter of said inner tube 34 is then forced downwardly to abut said dome shaped portion 68 to evenly pressure shape, punch and push the upper surface of said dome shaped portion downwards against the center portion 82 of said socket base 76 to force the excess metal provided by flattening said center portion 68 from dome to flat shape circumferentially outwardly to provide an integral doubled over lip 66 of two thicknesses, namely, the lower thickness 84 and the upper thickness 86 integral and even with the flattened center portion 64 of said base, said lip 66 extending partially over said well 62 until it abuts the inner tube wall and compactly overlies said tube lip 56 swaging said inner shell inturned circumferential lip 56 within said well 62 as shown in Fig. 8 and forming as an end product the composite inner shell and end turning cap swaged together as shown in Figs. 9–11.

It is thus apparent that I have provided a novel type of composite tube and cap swaged together in accordance with my invention and a novel method of its manufacture with the advantages explained above.

It is understood that my invention is not limited to the specific embodiment shown and that various deviations may be made therefrom without departing from the spirit and scope of the appended claims.

What I claim is:

1. An adjustable holder for lipsticks and the like including in combination: a tubular body-member; an advanceable and retractable carrier within the said body-member; and a tubular operating-member rotatable with respect thereto to advance and retract the carrier; the said operating-member including a sleeve-member having a bottom with a hole therethrough, and a sheet-metal cup-member having an integral hollow center-portion extending through the hole in said bottom and having a folded-over portion over the edge of said bottom adjacent said hole, and an operating-flange surrounding the periphery of the lower end portion of said body-member.

2. An adjustable holder for lipsticks and the like including in combination, a tubular body member, an advanceable and retractable carrier within the said body member, and an operating member rotatable with respect thereto to advance and retract the carrier, the said operating member including a base with a hole therethrough, and a sheet metal member having an integral hollow center portion extending through the hole in said bottom and having a folded-over portion over the edge of said bottom adjacent said hole.

WINFRED T. PARKIN.